No. 767,323. PATENTED AUG. 9, 1904.
V. G. APPLE.
INSULATED BATTERY CELL.
APPLICATION FILED NOV. 9, 1903.
NO MODEL
2 SHEETS—SHEET 1.

Witnesses:
Ray White.
Harry R. L. White.

Inventor:
Vincent G. Apple.
By Josie Bain, Atty.

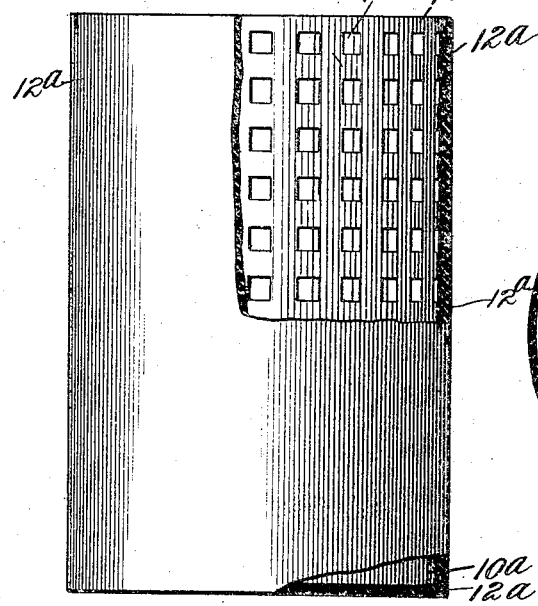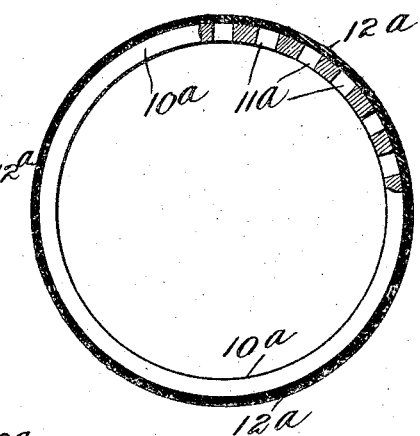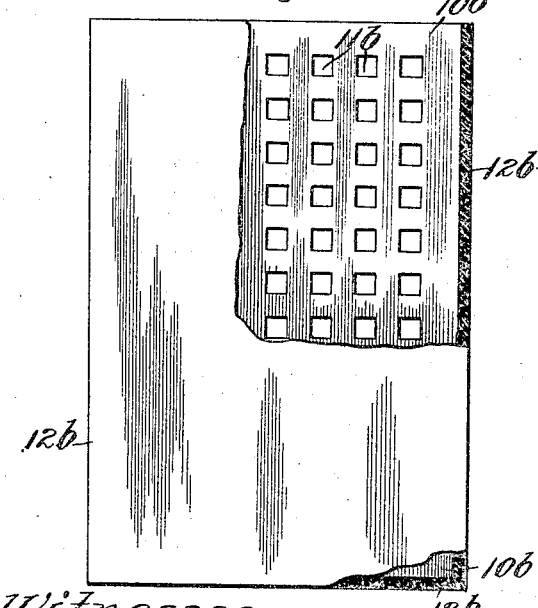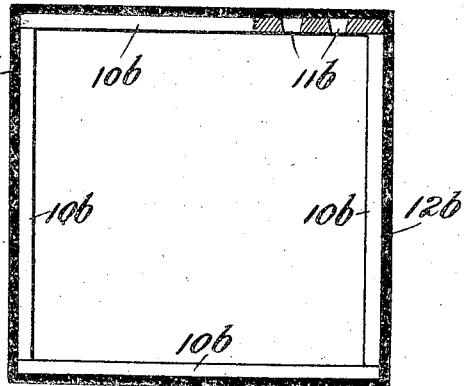

No. 767,323. Patented August 9, 1904.

UNITED STATES PATENT OFFICE.

VINCENT G. APPLE, OF DAYTON, OHIO.

INSULATED BATTERY-CELL.

SPECIFICATION forming part of Letters Patent No. 767,323, dated August 9, 1904.

Application filed November 9, 1903. Serial No. 180,463. (No model.)

*To all whom it may concern:*

Be it known that I, VINCENT G. APPLE, of Dayton, in the county of Montgomery and State of Ohio, have invented certain new and useful Improvements in Insulated Battery-Cells; and I hereby declare that the following is a full, clear, and exact description thereof, reference being had to the accompanying drawings, which form part of this specification.

My invention relates to insulated battery-cells, and has for its object to provide a cell exteriorly insulated throughout by a body of insulating material so applied thereto as to form a unitary structure.

Figure 1:
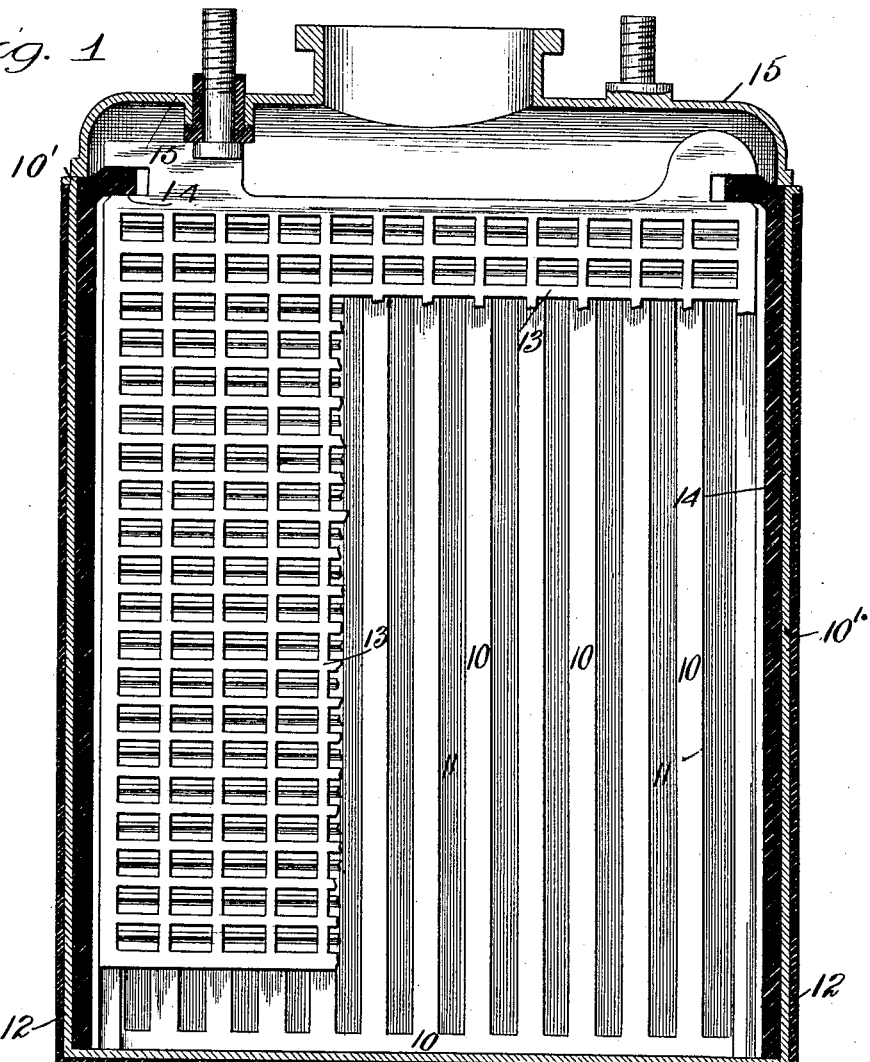
Figure 2:
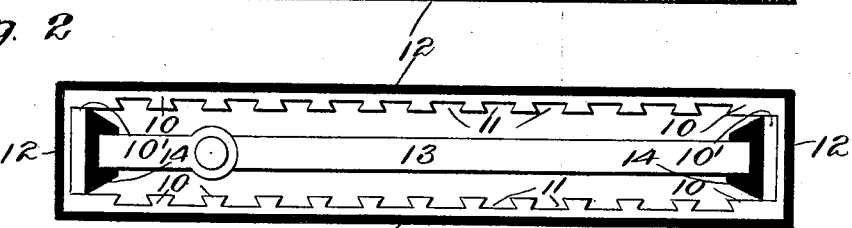

In the drawings, wherein I have illustrated the embodiments of my invention in three different forms of storage batteries, Figure 1 is a transverse vertical section of a storage battery embodying my invention. Fig. 2 is a plan view of the cell illustrated in Fig. 1 with the cover detached. Fig. 3 is an elevation of the casing of a cylindrical cell embodying my invention, the insulation being partly broken away. Fig. 4 is a top plan view, with parts broken away, of the said cylindrical casing. Fig. 5 is a side elevation, with parts of the insulation broken away, of a rectangular cell embodying my invention. Fig. 6 is a top plan view of the same with parts broken away.

Heretofore it has been practiced in the construction of battery-cells to provide an exterior casing of insulating material wherein the elements of the battery were positioned. It is advantageous, however, for many well-known reasons to so construct the exterior casing of the cell that it may be employed as one of the elements of the completed battery. It is with a view to producing a battery-casing which will combine in a unitary integral structure the strength, durability, and electrochemical qualities of a metallic casing with the elasticity, tenacity, impermeability, and insulating qualities of an insulating-shell that my present invention is designed.

To these ends my invention contemplates the provision of a unitary structure comprising an interior element of suitable metal adapted to form one of the elements of the battery, intimately united with an exterior covering of rubber applied thereto in such manner that the two layers form practically an integral structure. The insulating material employed is of such a nature that it may be applied to the metal in a softened condition and subsequently treated to cause it to harden in close adhesion to the metal. For instance, rubber and rubber compositions may be advantageously used, as when vulcanized to the metal such material will be so intimately attached to the metal as to be practically integral therewith. For convenience I will hereinafter refer to the insulating material as "rubber;" but it will be understood that other materials susceptible of equivalent treatment to secure like effects may be employed in lieu thereof.

Referring now specifically to Figs. 1 and 2, 10 indicates a metallic containing-case of suitable proportions, having imperforate sides provided with recesses 11 therein adapted to contain and support suitable active material, so that the case constitutes one of the elements of the battery. 12 is an uninterrupted impervious covering, of insulating material, such as rubber, applied to the casing 10 and preferably practically coextensive with the surface thereof. The rubber is vulcanized directly to the casing 10, so that it is so intimately joined thereto as to be substantially integral therewith. 13 indicates a battery plate or element designed to carry active material and supported within the casing 10 by insulating-supports 14. 15 indicates the top of the cell, suitably insulated from plate 13. These parts may be of any well-known or preferred construction and arrangement.

Referring now to Figs. 3 and 4, 10ª indicates a cylindrical containing-casing wherein are made holes 11ª, extending entirely therethrough and adapted to contain and support active material. 12ª indicates a covering of rubber vulcanized to the metal and completely overlying and closing exteriorly the apertures 11ª in the metallic casing 10ª. In such a cell structure the vulcanized rubber acts as an impervious and imperforate inclosing member, retaining therein the active materials of the battery and the electrolyte.

Referring now to Figs. 5 and 6, $10^b$ indicates metallic plates constituting the side walls of a rectangular casing, said walls being each perforated, as at $11^b$, to receive active material and being disconnected at the corners from each other. $12^b$ indicates the covering of insulating material surrounding said plates and forming an integral homogeneous casing intimately connected with each of the plates. Thus the plates will be supported in their proper relative positions by their adhesion to the insulation $12^b$, so doing away with the necessity of burning the plates together at their points of juncture or otherwise directly onnecting them to each other.

Other adaptations of the use of my invention will readily suggest themselves to those skilled in the art, and it will be apparent that said invention might be applied to advantage to primary cells.

Having thus described my invention, what I claim, and desire to secure by Letters Patent of the United States, is—

1. As an article of manufacture, a battery-cell comprising a containing-casing composed of metal with an exterior covering of insulating material susceptible of vulcanization, vulcanized thereto to constitute therewith an integral casing.

2. As an article of manufacture, a battery-cell comprising a containing-case composed of metal exteriorly coated with rubber applied thereto by vulcanization to form an uninterrupted, impervious, insulating-covering for the case.

3. As an article of manufacture, a battery-cell comprising a case of metal perforated to receive active material, and exteriorly coated with an impervious, uninterrupted coating of insulating material overlying the perforations and applied to the casing, to form therewith an integral structure.

4. As an article of manufacture, a battery-cell comprising a casing of metal composed of disjointed plates, retained and supported by an exterior coating of insulating material applied to the plates, to form therewith a unitary structure.

In testimony that I claim the foregoing as my own I affix my signature in presence of two witnesses.

VINCENT G. APPLE.

In presence of—
N. H. KELLEHER,
LILLIE WELLS.